United States Patent [19]

Reiner

[11] 3,951,337
[45] Apr. 20, 1976

[54] ARRANGEMENT, IN A WEATHER-DEPENDENT ADVANCE CONTROLLER OF TEMPERATURE OF A HEATING INSTALLATION, FOR FACILITATING ADJUSTMENT OF CONTROLLER CHARACTERISTICS TO HEATING CHARACTERISTICS

[75] Inventor: Eugen Reiner, Arbon, TG, Switzerland

[73] Assignee: Aktiengesellschaft Adolph Saurer, Switzerland

[22] Filed: Dec. 26, 1974

[21] Appl. No.: 536,468

[52] U.S. Cl. .................................. 236/91 F; 165/28
[51] Int. Cl.² ......................................... G05D 23/24
[58] Field of Search ................. 236/91, 94; 219/499; 165/28

[56] References Cited
UNITED STATES PATENTS

| | | | |
|---|---|---|---|
| 2,824,699 | 2/1958 | Jenkins et al. | 236/91 |
| 2,932,456 | 4/1960 | Deubel | 236/91 X |
| 3,054,562 | 9/1962 | Werts | 236/91 |

*Primary Examiner*—William E. Wayner
*Attorney, Agent, or Firm*—McGlew and Tuttle

[57] ABSTRACT

The arrangement comprises a Wheatstone bridge to which an operating potential is applied and whose diagonal is connected to a differential amplifier controlling a final control element for the temperature of the heating medium. One half of the bridge is constituted by a potentiometer, adjustable to effect parallel shifting of the controller characteristic curve, relating the outside temperature to the advance heating temperature of the heating medium, connected at a first junction point to a temperature sensitive resistor subjected to the temperature of the heating medium. The other half of the bridge is constituted by a first arm comprising a temperature sensitive resistor subjected to the outside temperature connected at a second junction point to a fixed resistor, and a second arm comprising two further fixed resistors connected to each other at a third junction point. An adjustable voltage divider is connected between the second and third junction points, and comprises a series connection of a second potentiometer and a limiting resistor. The adjustable tap of the second potentiometer is connected through a third potentiometer to the third junction point and is also connected to one input terminal of a threshold value switch whose other terminal is connected to the third junction point. The adjustable tap of the third potentiometer is connected to one input of the differential amplifier and the other input of the differential amplifier is connected to the first junction point. The second potentiometer is operable to adjust the slope of the controller characteristic curve in accordance with a preselected outside temperature, and the third potentiometer is adjustable in accordance with a selected advance temperature. The output of the threshold value switch is used to provide an indication as to whether, in case of an erroneous adjustment, the first potentiometer is to be used to effect a parallel shift of the curve or the second potentiometer is to be used to adjust the slope of the curve.

10 Claims, 7 Drawing Figures

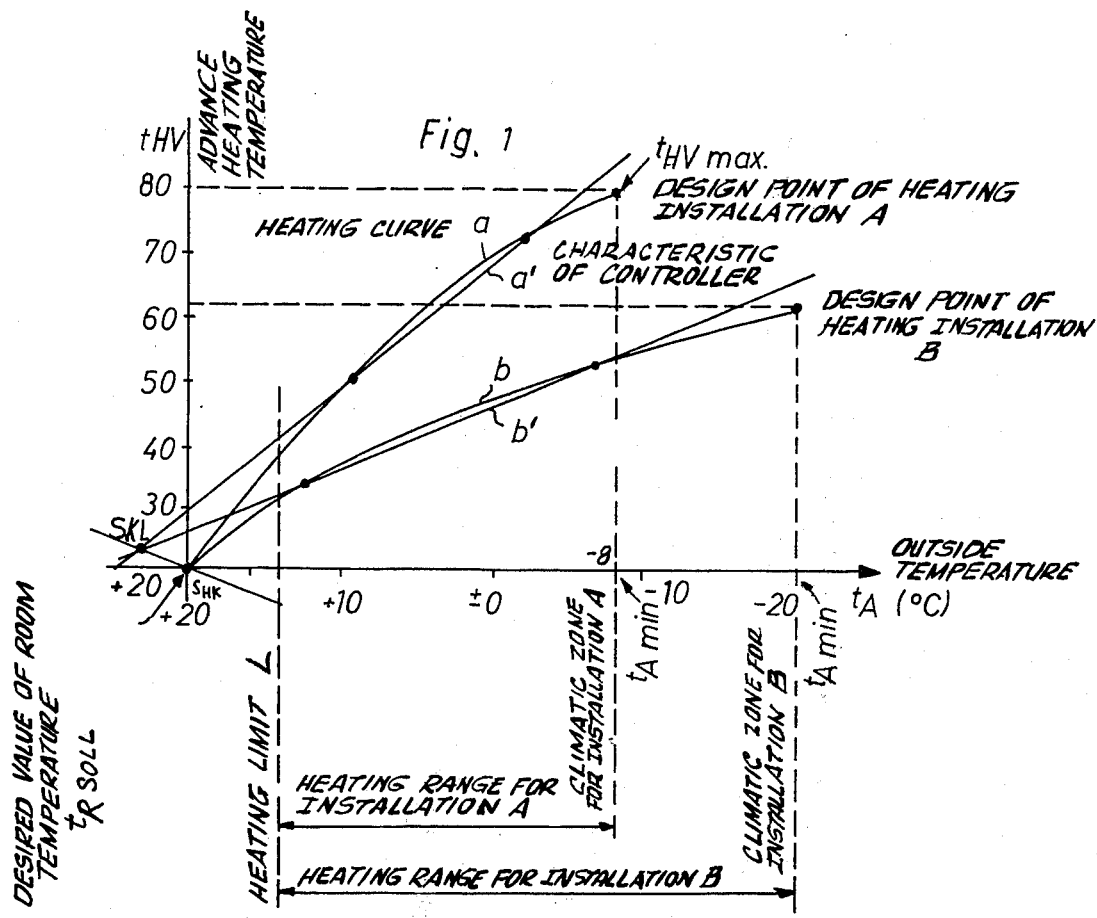
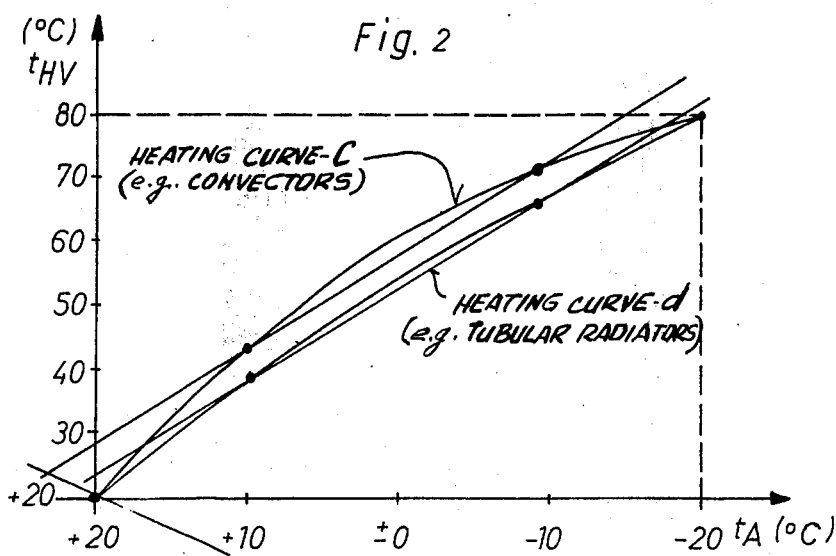

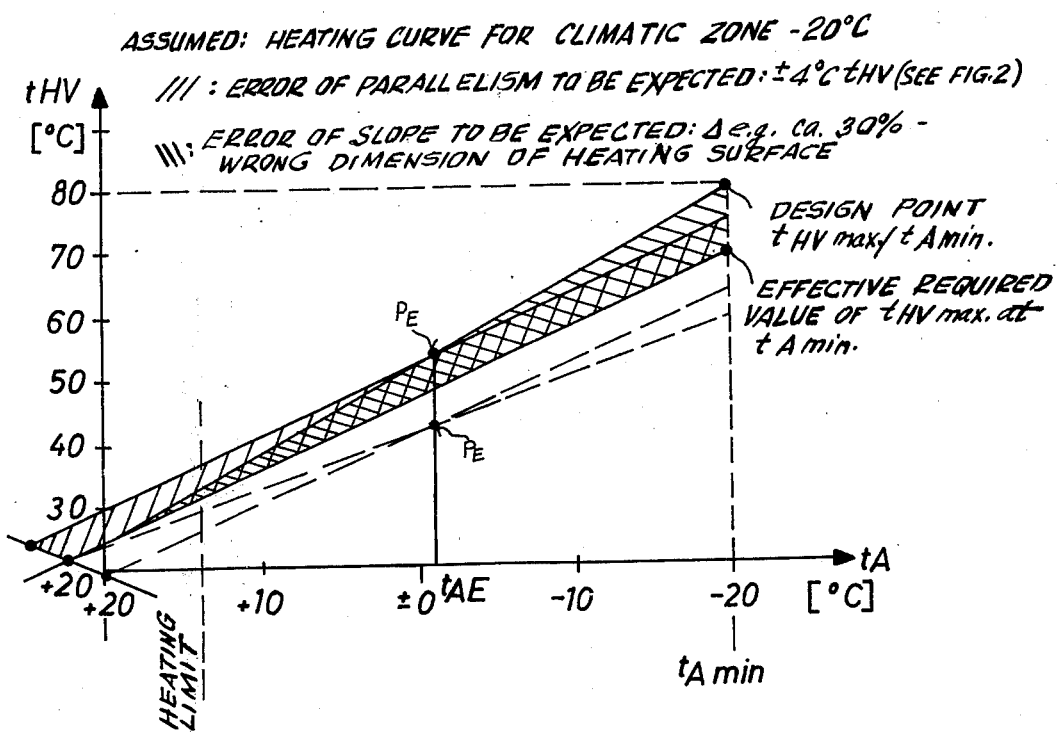

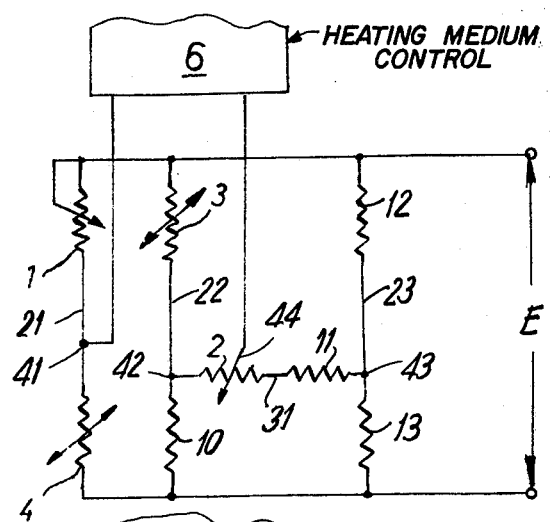
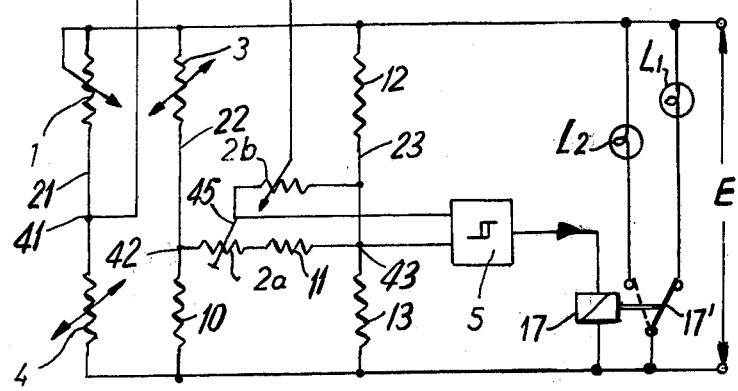

ARRANGEMENT, IN A WEATHER-DEPENDENT ADVANCE CONTROLLER OF TEMPERATURE OF A HEATING INSTALLATION, FOR FACILITATING ADJUSTMENT OF CONTROLLER CHARACTERISTICS TO HEATING CHARACTERISTICS

FIELD AND BACKGROUND OF THE INVENTION

This invention relates to an arrangement, in a weather-dependent advance controller of the temperature of a heating installation, intended for facilitating the adjustment of the control characteristic curve of the advance controller to a given heating characteristic curve, by means of at least two setting members.

The heating characteristics or characteristic curves are a function of the heating installation, the design of the building, and the climatic zone in which the building is located. Plotted in a system of rectangular coordinates, the heating characteristic curves intersect at a point. At this point, the outside temperature is equal to the desired temperature in the room or in the building and, consequently, also to the associated advance temperature. In the vicinity of this point, the heating characteristic curves have unequal curved shapes depending on the heating installation while, in their parts remote from this area, the characteristic curves are flattened. With respect to the temperature, these remote parts of the heating characteristic curves correspond to periods in which the building is heated. It is for this reason that, in general, the heating characteristic curve can be approximated by a straight line called the "heating line" and correspondingly treated. The straight heating lines intersect at a point which does not coincide with the point of intersection, mentioned above, of the heating characteristic curves.

As a rule, known heating control devices comprise at least two setting members by means of which the characteristics or characteristic curves of the controllers are brought into the best possible agreement with the heating line. To this end, both the pitch or slope of the characteristic curve of the controllers is adjustable and a parallel translatory shift of the characteristic curve can be produced. The decision as to which of the setting members is to be used for the correct adjustment of the controller characteristic curve is difficult for an inexperienced operator and frequently leads to wrong settings.

SUMMARY OF THE INVENTION

The objective of the present invention is the elimination of the mentioned drawbacks or disadvantages of the known arrangements and, for this purpose, the present invention is directed to an arrangement of the kind mentioned above permitting selecting the setting members for a correct adjustment and actuating them in a simple manner while, at the same time, substantially avoiding errors in recognition and adjustment.

In accordance with the invention, there is provided an electric value which is produced in a modified bridge circuit and is equivalent, as a decision value, to an outside temperature which is optimal for the respective climatic range and determining for the selection of the setting member to be actuated. This electric value is used to identify the setting member to be actuated. The identification may be effected either by a simple optical indication or by a mechanical blocking of one of the two setting members, or also by an alternate coupling of the respective more expedient setting member to a single actuating member. This results in an additional advantage of an extremely simple operation, and, in practice, to a complete elimination of errors.

An object of the invention is to provide an improved arrangement for facilitating the adjustment of the control characteristics of an advance controller in a weather-dependent advance controller of temperature of a heating installation.

Another object of the invention is to provide such an arrangement which avoids the disadvantages of known arrangements and permits selecting the setting member for a correct adjustment and to actuate the same in a simple manner.

A further object of the invention is to provide such an arrangement in which errors in recognition and adjustment of the setting members are substantially avoided.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a diagram showing the heating characteristics and associated controller characteristics of two heating installations A and B;

FIG. 2 is a diagram showing two heating characteristics $c$ and $d$ having a common design point and a common desired value but which have different shapes due to different characteristic properties of the heating bodies;

FIG. 3 is a diagram showing possible wrong positions of the controller characteristic;

FIG. 4 is a schematic wiring diagram of a conventional circuit arrangement for adjusting a controller;

FIG. 5 is a schematic wiring diagram showing the circuit arrangement of FIG. 4 as modified in accordance with the present invention.

DESCRIPTION OF THE PREFERRED EMBODIMENTS

Figure 6:
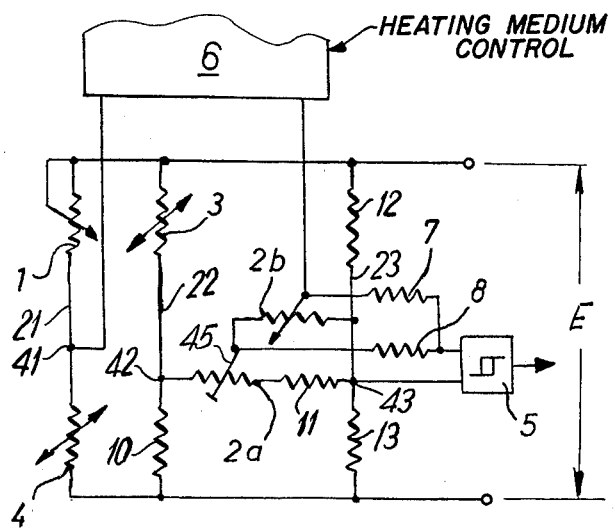
FIGS. 6 and 7 are schematic wiring diagrams showing further modifications of the circuit arrangement shown in FIG. 4.

FIG. 1 shows the heating characteristics $a$ and $b$, as well as the associated controller characteristics $a'$ and $b'$, of two different heating installations. Heating curve $a$ is associated with the heating installation A for a warmer climate, requiring a controller characteristic $a'$ which never falls below an outside temperature of −8°C, corresponding to "climatic zone −8°", while heating curve $b$ is associated with a heating installation B of a "climatic zone −20°" requiring a controller characteristic $b'$ which never falls below an outside temperature of −20°C. It should be noted that these curves show only the relation between the outside temperature and the advance temperature of the heating medium, and do not concern the quantitative flow of the heating medium, or the transmitted total heat quantity. The maximum required advance temperatures $t_{HVmax}$ of a heating installation, corresponding to the respective lowest outside temperature $t_{Amin}$, is given primarily by the relative dimensioning of the heating surface per heated space volume.

These heating curves $a$ and $b$ intersect at point $S_{HK}$ in which the outside temperature reaches the desired value of the room temperature and, consequently, corresponds also to the associated advance temperature of the heating medium.

FIG. 1 further shows the heating limit L, that is, the highest outside temperature at which heating is still necessary. At higher outside temperatures, as a rule, heating is no longer necessary. Therefore, it is obvious that, as to the control of the heating, the parts of the heating curves $a$ and $b$, extending beyond the heating limit L to the left in FIG. 1 are irrelevant. Since these parts have the smallest diameter radius of the associated heating curve $a$ or $b$, it is evident that only the flatter part of the heating curve $a$ and $b$ is usable and, therefore, the heating curve $a$ and $b$ can be approximated by resctive straight lines $a'$ and $b'$ constituting the characteristics $a'$ and $b'$ of the heating controller.

In case a heating system comprising a controller is newly installed in a building, the controller characteristic $a'$ or $b'$ adjusted at the start of the operation does not necessarily coincide with the required heating line, that is, the simplified heating curve, because, for the major part, the reference values, such as properties of the building, needed radiation surface, and the like are not exactly calculated.

It is for this reason that the position of the controller characteristic or characteristic curve differs from the position of the required heating line, and must be corrected by an actuation of the above-mentioned setting members. In deciding which of the setting members is more appropriate for the correction, it must be taken into consideration that the error resulting from a wrongly adjusted slope of the characteristic curve is the smaller the closer the instantaneous outside temperature is to the point of intersection of the characteristics, that is, the higher the outside temperature is.

On the other hand, the error of a wrong level of a characteristic curve is constant and is, relative to any error resulting from a wrongly adjusted slope, the less relevant the more the instantaneous outside temperature is distant from the point of intersection of the characteristics, that is, the lower the outside temperature is.

If the errors of the initial adjustment, which occur most frequently at the initial starting of a heating installation and which are empirical values, are known, an outside temperature $t_{AE}$ (FIG. 3) can be determined for any heating curve, and this temperature is a function of the respective climatic range. Above this temperature, the deviation of the desired value is more probably due to a wrong position of the level of the characteristic, while at lower outside temperatures, the error is due mostly to a wrong slope of the characteristic.

A value equivalent to this outside temperature $t_{AE}$, which may also be an empirical temperature, is derived, in accordance with the invention, from the control circuit and used for the selection of that setting member which is more appropriate for the correction.

The deviations from the desired position of the controller characteristic, adjusted at the start of the operation, occurring most frequently are empirical values which can be estimated. Consequently, a corresponding outside temperature can be defined for any heating curve and a successful correction can be expected from a parallel translatory shifting of the curve, at higher temperatures, and from a change of the slope of the curve, at lower temperatures.

For example, different heating arrangements (building properties, radiators/convectors) result in almost the same errors as to the position of the heating curves. Thus, as shown in FIG. 2, which illustrates different heating curves having a common design point and equal desired values, a translatory shifting must be provided for adjusting the controller characteristic.

However, since both errors are usually present at the same time, it is evident that it is not simple to base a decision in a respective case, on whether a necessary correction is to be effected by a translatory shifting or whether a change of the slope is necessary to obtain finally the best possible coincidence of the controller characteristic and required heating line. By selecting the wrong setting member for adjustment, it is true that the desired room temperature will also be obtained, but only at the instantaneous outside temperature while, at other outside temperatures, the deviations would even be increased.

FIG. 3 shows how the mentioned outside temperature $t_{AE}$, which is associated with the so-called "decision point" PE, can be determined by estimating the errors most frequently to be expected at the initial adjustment of the controller, depending on their value and nature.

The bridge circuitry of the conventional controller, for controlling the advance temperature as a function of the outside temperature, shown in FIG. 4 by way of example, comprises a total of three parallel-connected longitudinal lines or branches 21, 22 and 23 having a supply voltage E applied thereto as at the indicated terminals. The line or branch 21, comprising resistors 1 and 4, forms one-half of a Wheatstone bridge, while the other half of the bridge is formed by the branches 22 and 23 comprising resistors 3, 10, and 12, 13. Resistor 1 constitutes the setting member for the parallel shifting of the controller characteristic curve, and is therefore designed as a potentiometer, while resistors 3 and 4 are temperature dependent resistors or temperature sensitive resistors having temperature coefficients of the same sense, that is both negative or both positive. Resistor 3 is responsive to outside temperature, while resistor 4 is responsive to the advance temperature of the heating medium or fluid. Between the junction points 42, between resistors 3 and 10, and 43, between resistors 12 and 13, a diagonal 31 is connected as an adjustable voltage divider. This adjustable voltage divider comprises a potentiometer 2, designed as a setting member for the slope of the characteristic curve, and a limiting resistance 11, determining the smallest possible slope. The pick-off or adjustable tap 44 of potentiometer 2 is connected to the input of a differential amplifier 6, constituting a heating medium control, whose other input is connected to the junction point 41 between resistors 1 and 4.

This conventional bridge circuitry operates in a manner which will now be described. The bridge resistors are so dimensioned that, at an equal temperature of the two sensor resistors 3 and 4 corresponding approximately to the desired value of the room temperature $t_{RSo11}$, hereinafter designated as the "desired value", the potentials of junction points 41, 42 and 43 are identical. Thus, for any position of the tap of slope setting member 2, the potential difference delivered to amplifier 6 is equal to O which means that, in the system of coordinates $t_{HV}/t_A$, all characteristics run together at point $S_{KL}$ having the coordinates $t_{HV} \approx t_A \approx t_{RSo11}$, as seen in FIG. 1. As soon as the outside temperature $t_A$ drops, the resistance of sensing resistor 3 changes and a potential shift appears at junction point 42 which, in a proportion corresponding to the adjustment of slope setting member 2, is picked off at tap 44 and supplied to amplifier 6. The amplifier controls a final control element of known design, which has not been shown, so that in rising of the advance temperature $t_{HV}$, the potential at junction point 41 is equated, through advance sensor 4, to the potential at tap 44. Thus, a decreasing outside temperature $t_{TA}$ results in an increase of the advance temperature $t_{HV}$ which is the higher the more to the left the tap of slope setting member 2 of FIG. 4 is displaced. That is, each position corresponds to a definite slope of the characteristic, such as the characteristics $a'$ and $b'$ of FIG. 1. On the other hand, the change in position of setting member 1 for parallel shifting of the characteristic only simulates another advance temperature and shifts the characteristics in the direction of the ordinate. With the aid of these two setting members, the controller characteristic is adjusted to the required heating curve, which varies in accordance with the heating installation and the climatic zone.

In this conventional circuitry, however, the position of the slope adjusting potentiometer 2 cannot provide any indication as to the climatic range for which the installation is provided. For example, characteristic $b'$ could belong to a convector heating designed for an advance temperature of max. + 62°C and an outside temperature of − 20°C, that is "climatic zone −20", as well as to a surface heating designed for an advance temperature of max. + 45°C and the "climatic zone 0".

In accordance with the present invention, the function of the usual slope adjusting potentiometer 2 is assigned to two separate setting members 2a and 2b, as shown in FIG. 5. With the position of the adjustable taps of both setting members 2a and 2b at the left hand stop, the largest possible slope of the characteristic curve is adjusted, analogously to FIG. 4. It may be assumed that, in this case, at an outside temperature of $t_A$ of 0°C, an advance temperature $t_{HV}$ of 110°C is adjusted. In itself, the operation of the two setting members 2a and 2b is the same as the operation of the slope potentiometer 2 of FIG. 4.

Thus, by displacing slider 45 of setting member 2a to the right, a more flattened characteristic curve is obtained. The scale division of setting member 2a is so provided that each position is associated with an outside temperature $t_A$ at which there appears, at adjustable tap 45, the same potential corresponding to an advance temperature of $t_{HV}$=110°C. At the right extreme position of slider 45 of setting member 2a, a temperature of, for example, − 40°C of the outside sensor 3 would be necessary for this purpose and, at a middle position, a temperature of approximately − 20°C.

The potential difference between adjustable tap 45 and junction point 43 is divided again by the adjustable tap of setting member 2b, so that each position can be associated with a corresponding advance temperature $t_{HV}$ between max. + 110°C, at the left stop, and min. approximately + 40°C, at the right stop. If, for example, setting member 2a is adjusted to "−20°" and, at the same time, setting member 2b is adjusted to "+ 62°", the characteristic $b'$, shown in FIG. 1, is obtained, since it is only at − 20°C of the outside sensor temperature that a potential corresponding to an advance temperature of + 110°C appears at adjustable tap 45. However, this potential is divided again by the position of the adjustable tap of setting member 2b, so that only an advance temperature of + 62°C is adjusted. The same characteristic would be obtained with an adjustment of the tap of setting member 2a to "0°" and an adjustment of the tap of setting member 2b to "+ 45°".

The first advantage resulting therefrom is an easily understandable initial adjustment of the heating curve, because it is possible to adjust directly the coordinates of the heating installation, that is, the maximum required advance temperature $t_{HVmax}$ at the lowest temperature $t_{Amin}$ occurring at the location of the installation in accordance with the "climatic zone", without having first, after recalculation or comparison with a diagram provided by the manufacturer, to look for the figure corresponding to a polar coordinate which, in addition, may be different for the same slope adjustment, depending on the equipment.

Another advantage is that, from the position of the adjustable tap of setting member 2a, there can be derived an electric value depending from the respective "climatic zone", by means of which, at, exceeding, or falling below the outside temperature that value $t_{AE}$, which is determining the selection of the setting member 1 or the setting member 2b in accordance with a given "climatic zone", the respective member to be adjusted may be identified to the operator by an optical indication or mechanically. It is useful to design the setting member 2a, for adjusting the "climatic zone", as a trimming potentiometer whose position remains unchanged after the initial adjustment.

With reference to FIG. 5, the most simple circuit arrangement which, however, is satisfactory for normal operation, will now be explained. A threshold value switch 5 is designed to change suddenly its output value, for example, from a low voltage to a high voltage or from a low ohmic resistance to a high ohmic resistance, as soon as a predetermined input voltage difference is exceeded. The input voltage of threshold value switch 5 corresponds to the potential difference between junction point 43 and adjustable tap 45 of setting member 2a. As mentioned above, the potential at junction point 43 corresponds to that at junction points 41 and 42 as long as outside sensor 3 and advance sensor 4 both have approximately a temperature corresponding to the desired value of the room or building temperature $t_{RSoll}$. As soon as the outside temperature drops below this value, sensor resistor 3 effects a potential displacement so that a potential difference appears between junction points 42 and 43 and is proportional to the difference between the outside temperature and the desired value of room temperature. Since, at an outside temperature corresponding to the adjusted "climatic range", the potential at adjustable tap 45 always has the same value and, on the other hand, the potential at junction point 43 remains constant, the potential difference between these two points corresponds to the relative deviation of the outside temperature from the desired value of the room temperature, or to the point of intersection of the heating curves, relative to the difference between the desired value of the room temperature and the climatic zone value.

Consequently, for example, if threshold value switch 5 is adjusted to two-thirds of this maximum potential difference, as soon as the outside temperature correspondingly drops, switch 5 changes its output value and thus takes a decision that setting member 2b is to be used for the correction. In this case, the decision temperature $t_{AE}$ would be given by the formula:

$$T_{RSo11} - \frac{(T_{RSo11} - T_{Amin} \text{ [climatic zone] }) \times 2}{3} = T_{AE}$$

for example:
climatic zone = 0 − 10°, $t_{Rso11} = +20°$, $$T_{AE} = +20 - \frac{(+20 + 10) \times 2}{3} = 0°$$

In this simple circuit arrangement, the decision temperature $t_{AE}$ is determined only according to the adjusted "climatic zone". It may now be desirable to make the variation of the decision temperature $t_{AE}$ dependent not only on a "climatic zone" but also on another influencing value, such as the heating system. The adjustment of potentiometer 2b, for setting the maximum required advance temperature, can serve as a rough measure for this purpose because, for example, an adjustment to 45°C may be associated with a surface heating or an adjustment to 80°C with a radiator heating. FIG. 6 shows such a circuit arrangement including summing members 7 and 8 corresponding to the ratio of the two influencing values.

Figure 7:
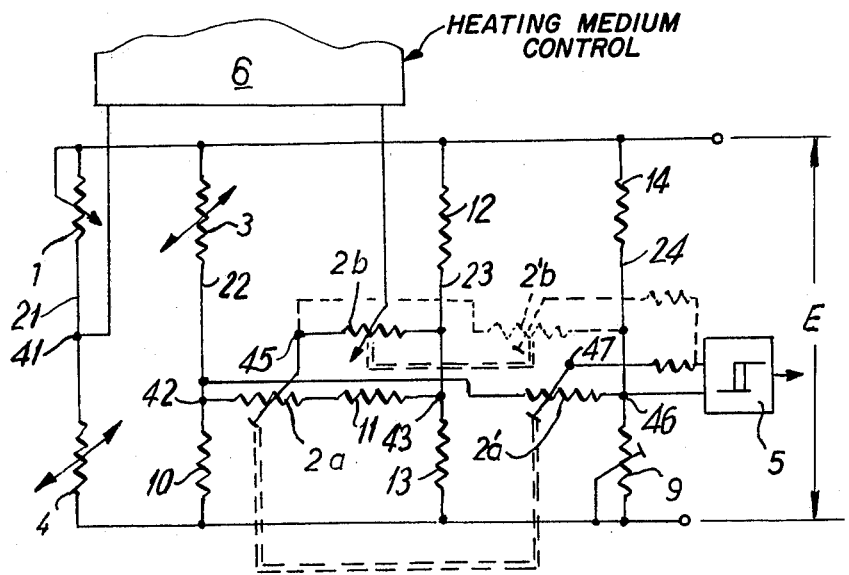

FIG. 7 illustrates a circuit arrangement in which it is possible, due to an additional bridge series branch or auxiliary bridge arm 24 including series connected resistors 9 and 14, to compare the potential change appearing at adjustable tap 47 and divided depending from the adjusted "climatic zone" with a potential at junction point 46 corresponding to any selectable outside temperature. Resistance 9, it will be noted, is a potentiometer and resistance 14 is a fixed resistor. A still better optimizing of the variation of the decision temperature $t_{AE}$ over the entire "climatic range" in question is thereby obtained. Since, in this case, setting member 2a and, perhaps also, setting member 2b can no longer be used, electrically separated but mechanically coupled setting members 2a' and 2b' are provided in the form of tandem potentiometers.

Further, and by way of example, FIG. 5 shows how which of the setting members 1 or 2b is to be used can be identified by the output signal of threshold value switch 5, by excitation of a relay 17 having a changeover contact 17', in accordance with the decision value appearing at the input, by connecting lamp L1 or lamp L2 to the supply potential. Instead of these lamps, other known electromechanical elements, in the form of coupling or locking elements, could also be selected.

While specific embodiments of the invention have been shown and described in detail to illustrate the application of the principles of the invention, it will be understood that the invention may be embodied otherwise without departing from such principles.

What is claimed is:

1. In a weather-dependent advance controller of the temperature of a heating installation and of the type including a bridge circuit having an input connected to a source of potential and an output connected to a heating medium control and further having at least a first setting member, adjustable to shift the controller characteristic curve, relating the outside temperature to the advance heating temperature of the heating medium, parallel to itself and a second setting member, adjustable to change the slope of controller characteristic curve, to effect substantial coincidence between the controller characteristic curve and a given heating characteristic curve, also relating the outside temperature to the advance heating temperature of the heating medium, an arrangement for facilitating such adjustment comprising, in combination, means in the output of said bridge circuit operatively associated with at least one of said setting members and cooperable therewith to produce an electric value equivalent, as a decision value, to an outside temperature which is optimal for the respective climatic range; and means connected to said bridge circuit and operable, responsive to such electric value, to identify which of said first and second setting members is to be adjusted to secure said substantial coincidence of the controller and heating characteristic curves.

2. In a weather-dependent advance controller, an arrangement as claimed in claim 1, in which said means in the output of said bridge circuit is operatively associated with said second setting member.

3. In a weather-dependent advance controller, an arrangement as claimed in claim 2, in which said means in the output of said bridge circuit comprises an additional setting member in series with said second setting member; one of said second and additional setting members being operable to adjust the characteristic coordinate value of the climatic zone and the other of said second and additional setting members being operable to adjust the associated coordinate value of the maximum advance temperature.

4. In a weather-dependent advance controller, an arrangement as claimed in claim 1, in which said bridge circuit has first, second and third arms; said first arm comprising a potentiometer constituting said first setting member connected, at a first junction point, in series with a first temperature sensor resistor subjected to the advance temperature of the heating medium; said second bridge arm comprising a second temperature sensor resistor subjected to the outside temperature connected, at a second junction point, in series with a fixed resistor; said third bridge arm comprising second and third fixed resistors connected in series with each other at a third junction point; a voltage divider connecting said second and third junction points and including, in series, a potentiometer constituting said second setting member and a limiting resistor; said means in the output of said bridge circuit comprising a third potentiometer connected to an adjustable tap of said second setting member; the bridge outputs being derived between said first junction point and an adjustable tap of said third potentiometer; said last named means being connected to said third junction point and the adjustable tap of said second setting member.

5. In a weather-dependent advance controller, an arrangement as claimed in claim 4, in which said last named means comprises a threshold value switch.

6. In a weather-dependent advance controller, an arrangement as claimed in claim 1, in which such identification is provided by respective lamps each operatively associated with one of said first and second setting members.

7. In a weather-dependent advance controller, an arrangement as claimed in claim 1, including a common actuating member for said first and second setting members; such identification being effected by a coupling selectively operable to connect said common actuating member to a selected one of said first and second setting members.

8. In a weather-dependent advance controller, an arrangement as claimed in claim 4, including first and second summing members connected in parallel to an input terminal of said last named means, one summing member being connected to the adjustable tap of said second setting member and the other summing member being connected to the adjustable tap of said third potentiometer; the ratio of said summing members corresponding to the ratio of two influencing values, including the climatic zone and the heating system.

9. In a weather-dependent advance controller, an arrangement as claimed in claim 4, in which said bridge circuit further comprises an auxiliary bridge arm including a potentiometer and a fixed resistor connected in series with each other at a junction point and providing for the derivation of the decision value to be selected from a reference temperature which is independent of the point of intersection of the two characteristic curves.

10. In a weather-dependent advance controller, an arrangement as claimed in claim 9, including two additional setting members mechanically connected to said controller but electrically separated therefrom and operable to set the value of the adjusted characteristic.

\* \* \* \* \*